(12) United States Patent
Van Dyke

(10) Patent No.: US 8,251,378 B2
(45) Date of Patent: Aug. 28, 2012

(54) FOLDABLE AND FLEXIBLE SLED

(75) Inventor: Peter Andrew Van Dyke, Edina, MN (US)

(73) Assignee: Peter Andrew Van Dyke, Minneapolis, MN (US)

( * ) Notice: Subject to any disclaimer, the term of this patent is extended or adjusted under 35 U.S.C. 154(b) by 0 days.

(21) Appl. No.: 12/642,822

(22) Filed: Jan. 19, 2010

(65) Prior Publication Data

US 2011/0175303 A1 Jul. 21, 2011

(51) Int. Cl.
B60J 3/00 (2006.01)
(52) U.S. Cl. .................. 280/20; 280/18.1
(58) Field of Classification Search .......... 280/16, 280/17, 18, 18.1, 20, 21.1, 27
See application file for complete search history.

(56) References Cited

U.S. PATENT DOCUMENTS

| | | | |
|---|---|---|---|
| 144,078 A | 1/1923 | Kohigsbeeg | |
| 2,464,341 A * | 3/1949 | Ostlund | 280/18.1 |
| 2,493,315 A * | 1/1950 | Ruka | 280/18.1 |
| 2,971,767 A * | 2/1961 | Eaton | 280/18.1 |
| 3,140,878 A * | 7/1964 | Davis | 280/18 |
| D206,335 S | 11/1966 | Solipasso | |
| 337,294 A | 3/1968 | Lauritzen et al. | |
| 3,625,533 A * | 12/1971 | Boe | 280/18 |
| 3,771,808 A * | 11/1973 | Duerst | 280/19 |
| 3,884,490 A * | 5/1975 | Hellman | 280/18 |
| 4,283,068 A * | 8/1981 | Keyser | 280/19 |
| 4,609,201 A * | 9/1986 | Flachsmann | 280/20 |
| 4,657,266 A * | 4/1987 | Bohme | 280/18 |
| 470,971 A | 12/1987 | Nichols | |
| 471,868 A | 1/1988 | Rabatic | |
| 5,246,401 A * | 9/1993 | Boatwright | 472/116 |
| 564,528 A | 7/1997 | Harmon | |
| 5,893,570 A * | 4/1999 | Kehrmann | 280/18.1 |
| 594,154 A | 8/1999 | Minkus | |
| 6,017,043 A * | 1/2000 | Bennett et al. | 280/18 |
| D481,655 S * | 11/2003 | McKee | D12/11 |
| 664,839 A1 | 11/2003 | Monahan et al. | |
| D491,852 S | 6/2004 | Corella | |
| 693,894 A1 | 9/2005 | Ytterberg | |
| 694,200 A1 | 9/2005 | Le Gette et al. | |
| 6,976,523 B2 | 12/2005 | Huang | |
| 7,040,333 B1 | 5/2006 | Ransom et al. | |
| 7,114,759 B1 | 10/2006 | Chen et al. | |
| 717,458 A1 | 2/2007 | Danaher | |
| D555,748 S | 11/2007 | Gyr et al. | |
| 7,380,802 B1 * | 6/2008 | Kramer | 280/21.1 |
| D573,062 S | 7/2008 | Litchfield | |
| 7,458,592 B2 * | 12/2008 | Maratta | 280/87.041 |
| 7,468,020 B2 * | 12/2008 | Lai | 482/28 |
| 772,743 A1 | 6/2010 | Wilson | |
| 795,450 A1 | 6/2011 | Price et al. | |
| 2003/0127812 A1* | 7/2003 | Mehrmann et al. | 280/14.21 |
| 2004/0026881 A1* | 2/2004 | Touchette | 280/20 |

* cited by examiner

*Primary Examiner* — J. Allen Shriver, II
*Assistant Examiner* — James Triggs

(57) ABSTRACT

The Foldable/Flexible sled is a lightweight circular sled that folds up into itself, with two quick hand motions, for quick and easy transport. Made of soft, flexible material it is also less dangerous in the case of sledding accidents.

24 Claims, 3 Drawing Sheets

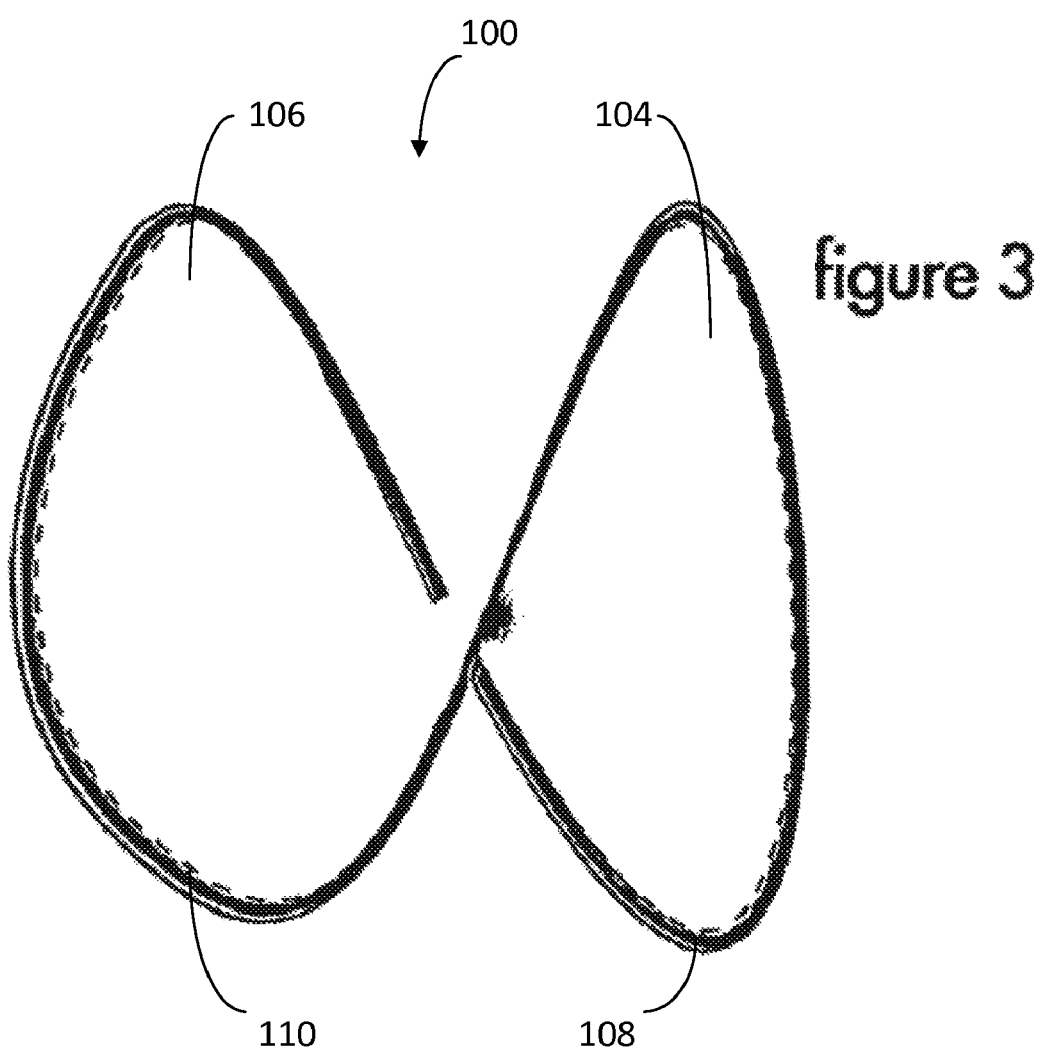

FOLDABLE AND FLEXIBLE SLED

BACKGROUND OF THE INVENTION

The field of endeavor to which this invention pertains is recreational snow sleds. The purpose of this invention is to provide a sled that is lightweight, compact, and foldable. This invention should solve the problem of sled injuries, caused by heavy sleds hitting children on the sled hill. This invention also solves the issue of transporting heavy sleds to a hill and storing bulky sleds. This sled can by quickly folded and easily carried to a hill. It can be stored in a small space while not being used.

BRIEF SUMMARY OF THE INVENTION

The foldable flexible sled is a lightweight sled that folds up into itself for quick and easy transport. Made of soft and flexible material it is also less dangerous in the case of a collision or other sledding accidents. The object of the invention is to provide a sled that is easy to transport and store. The sled also provides a fast, fun ride down a hill. Additionally, the sled is safer in case of a collision because of the soft nature of the materials used.

BRIEF DESCRIPTION OF THE SEVERAL VIEWS OF THE DRAWING

FIG. 3 shows the complete twist of the sled just before it is folded together. The sled is twisted into a figure eight, as shown in the drawing. The two circles that form the eight are then folded together, one on top of the other.

DETAILED DESCRIPTION OF THE INVENTION

Figure 1:
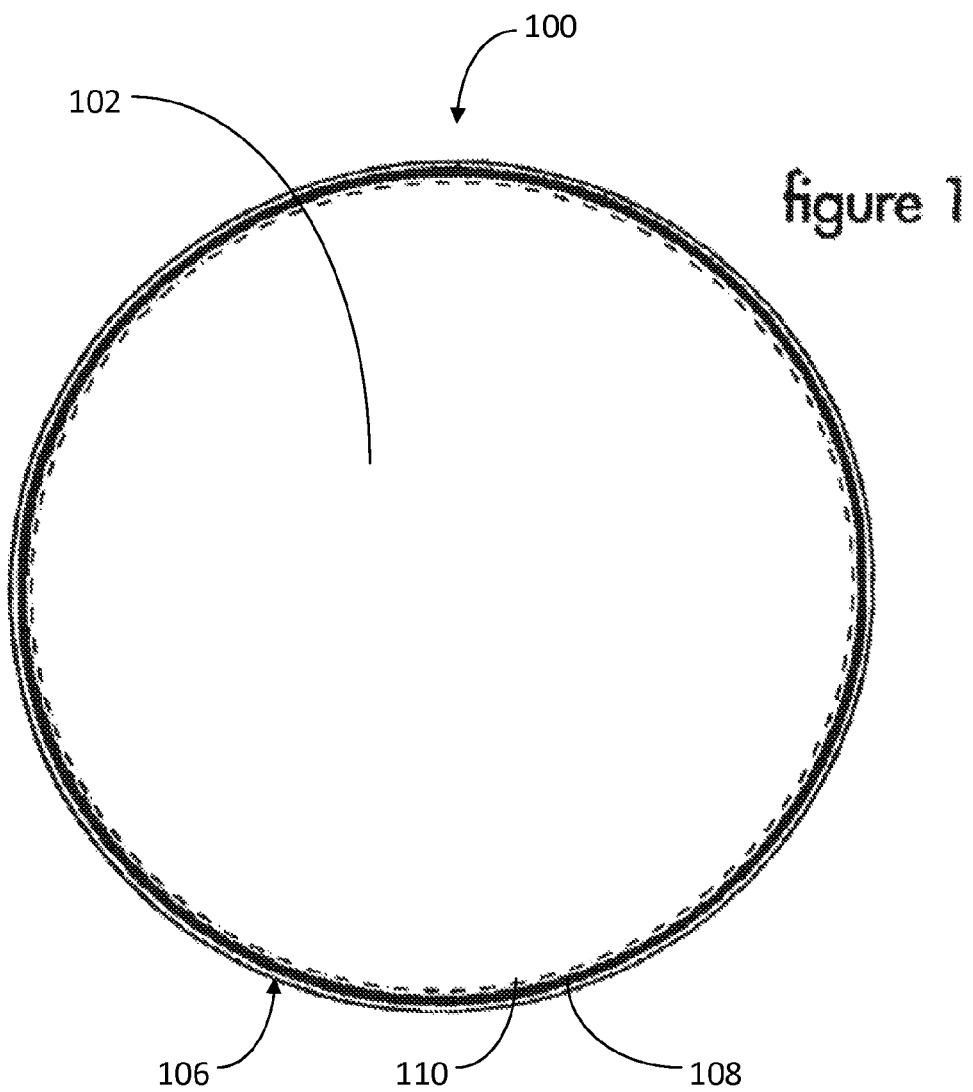
FIG. 1 shows the sled in its open form. The sled is circular, made of pliable fabric. One side is smooth to reduce friction. A thin, flexible, circular rod is sewn into the outer edge.

The circular sled 100 is approximately 32 inches in diameter in its full form as pictured in FIG. 1. The material is a thick, durable nylon fabric 102 on one side and a smooth vinyl fabric on the other side 104.

Around the perimeter 106 is a circular, flexible metal or plastic rim 108. The rim 108 is encased in a hem 110 of the fabric 102 or 104. The two circles of fabric are sewn together and a hem 110 of approximately ½ inch is sewn to encase the rim 108. The smooth vinyl side 104 is configured to be placed on the snow, and the nylon side 103 is where the user sits. The user holds onto the sides of the sled (e.g. rim 108) as he/she slides down the hill.

The foldable/Flexible sled 100 provides a slick, fun ride down a hill. We have tested the sled 100 in a variety of snow conditions and it works as well or better than other sleds currently on the market.

Figure 2:
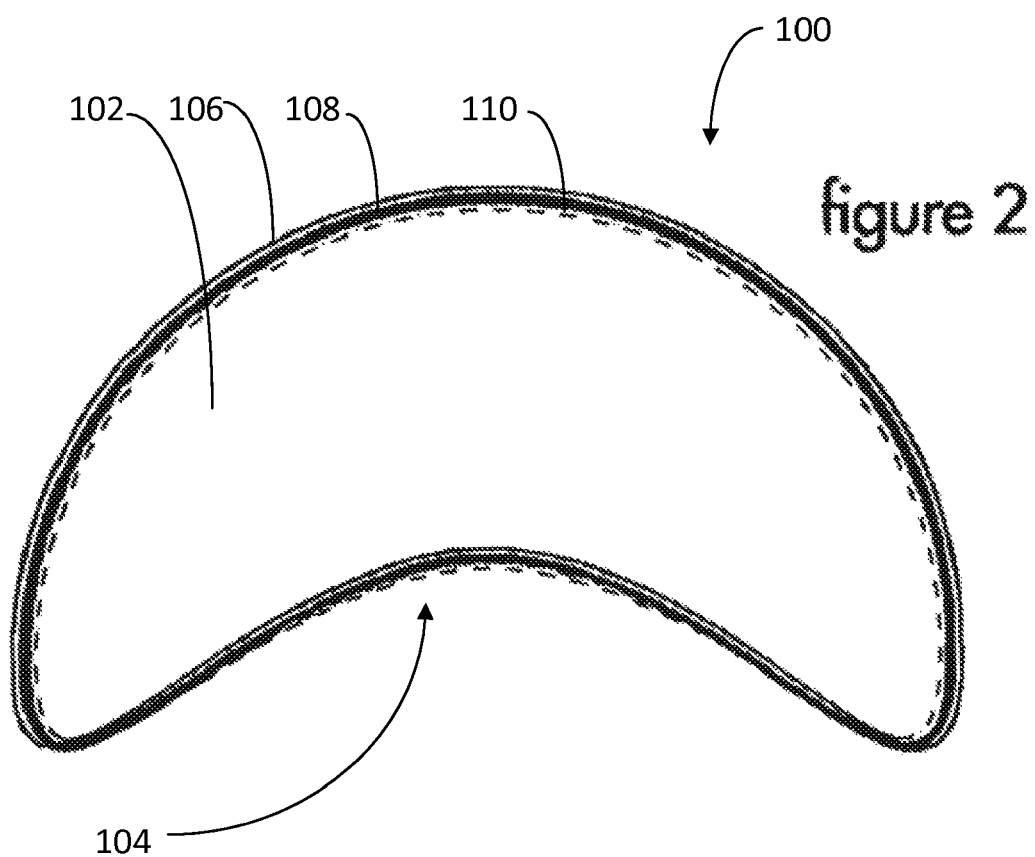
FIG. 2 shows the sled as it is starting to be folded. The sled is grasped on both sides, one hand on each side. One hand twists clockwise, the other counterclockwise, to begin the folding process.

The sled 100 folds up easily into a 12 inch circle (1 inch high) for easy transport and storage. The fold process begins with the user placing one hand on each side of the sled. One hand turns the sled 100 in a clockwise direction; the other hand twists the sled 100 in a counterclockwise direction. The sled 100 begins to twist as shown in FIG. 2. The user continues to twist the sled 100 into a full figure eight as shown in FIG. 3. The figure eight is then folded in half. The folding process can be completed in two quick motions that are easy for a child to do.

The sled 100 in its folded position is easy to carry and store. This solves storage space problems. Many homes have inadequate storage space for winter toys. The sled 100 is also easier to stow in a vehicle on the way to a sledding hill, or can be more easily brought to sledding parties. The sled 100 is also easier for a child to carry up a hill (without adult help). There is no other sled available that compacts into a 12 inch circle.

The Foldable/Flexible sled 100 also addresses some of the safety issues involved in sledding. Every year many children are injured by heavy sleds that hit them on a hill. Sleds collide & sometimes sleds escape their owners and go down a hill without a rider. These runaway sleds account for many injuries as they hit children at the bottom of the hill. Injuries from these accidents can be as common as bruises and as serious as concussions. The Foldable/Flexible sled 100 is very light and minimizes chances of injury from impact with a sled.

The invention claimed is:

1. A flexible sled, comprising:
a flexible body including a perimeter, the flexible body being configured to be in a sledding position and a storage position, a first side and a second side remote from the first side in the sledding position, wherein the flexible body includes a multi-layer construction with a first layer and a second layer including vinyl to contact snow in the sledding position and in contact with the first layer, wherein the first layer is different than the second layer and defines the first side, wherein the second layer defines the second side; and
a foldable rod adjacent the perimeter of the flexible body, the foldable rod being unfolded in the sledding position of the flexible body to allow the flexible body to be used as a sled, the foldable rod being folded when in the storage position of the flexible body;
wherein the storage position has a smaller size than the sledding position;
wherein the foldable rod is twistable into an intermediate figure eight position between the sledding position of flexible boy and the storage position of the flexible body, wherein the foldable rod includes metal;
wherein a first part of the first side and a first part of the second side face each other in the storage position;
wherein the flexible body in the storage position has a second part of both of the first side and the second side facing outwardly;
wherein the flexible body in the sledding position has a circular shape; and
wherein the foldable rod is twisted such that the foldable rod crosses itself at one location to form a lemniscate which becomes a fold whereat a first lob of the intermediate figure eight position is folded onto a second lob of the intermediate figure eight position to place the foldable rod in the storage position.

2. The sled of claim 1, wherein the foldable rod includes a metal rod.

3. The sled of claim 1, wherein the foldable rod includes a plastic rod.

4. The sled of claim 1, wherein the flexible body in the sledding position has a diameter of about 32 inches.

5. The sled of claim 4, wherein the flexible body in the storage position has a diameter of about 12 inches.

6. The sled of claim 1, wherein the first layer includes nylon.

7. The sled of claim 6, wherein the second layer consists of vinyl.

8. The sled of claim 7, wherein the flexible body includes a hem adjacent the perimeter to enclose the foldable rod.

9. The sled of claim 1, wherein the flexible body in the storage position has a diameter of about 12 inches.

10. The sled of claim 1, wherein the flexible body in the storage position has a thickness of about 1 inch.

11. The sled of claim 1, wherein the flexible body includes nylon or vinyl and a hem adjacent the perimeter to enclose the foldable rod adjacent the perimeter.

12. The sled of claim 1, wherein the flexible body includes means for reducing accidents.

13. A foldable sled, comprising:
   a flexible body including a perimeter, the flexible body being configured to be in a sledding position and a storage position, a first side and a second side remote from the first side in the sledding position, wherein the flexible body includes a multi-layer construction with a first layer and a second layer in contact with the first layer, the second layer configured to contact snow in the sledding position and define the second side, wherein the first layer is different than the second layer and defines the first side;
   a foldable rod adjacent the perimeter of the flexible body, the foldable rod being unfolded in the sledding position of the flexible body to allow the flexible body to be used as a sled, the foldable rod being folded when in the storage position of the flexible body, wherein the foldable rod is a plastic rod;
   wherein the storage position has a smaller size than the sledding position;
   wherein the foldable rod is twistable into an intermediate figure eight position between the sledding position of flexible boy and the storage position of the flexible body; and
   wherein a first part of the first side and a first part of the second side face each other in the storage position;
   wherein the flexible body in the storage position has a second part of both of the first side and the second side facing outwardly;
   wherein the flexible body in the sledding position has a circular shape;
   wherein the foldable rod is twisted such that the foldable rod crosses itself at one location to form a lemniscate which becomes a fold whereat a first lob of the intermediate figure eight position is folded onto a second lob of the intermediate figure eight position to place the foldable rod in the storage position;
   wherein the flexible body in the storage position has a diameter of about 12 inches;
   wherein the flexible body in the storage position has a thickness of about 1 inch; and
   wherein the flexible body includes nylon or vinyl and a hem adjacent the perimeter to enclose the foldable rod adjacent the perimeter.

14. The sled of claim 13, wherein the first layer includes nylon.

15. The sled of claim 14, wherein the second layer includes vinyl to contact snow in the sledding position.

16. A foldable sled, comprising:
   a flexible body including a perimeter, the flexible body being configured to be in a sledding position and a storage position, a first side and a second side remote from the first side in the sledding position;
   a foldable rod adjacent the perimeter of the flexible body, the foldable rod being unfolded in the sledding position of the flexible body to allow the flexible body to be used as a sled, the foldable rod being folded when in the storage position of the flexible body;
   wherein the storage position has a smaller size than the sledding position;
   wherein the foldable rod is twistable into an intermediate figure eight position between the sledding position of flexible boy and the storage position of the flexible body; and
   wherein a first part of the first side and a first part of the second side face each other in the storage position;
   wherein the flexible body in the storage position has a second part of both of the first side and the second side facing outwardly;
   wherein the flexible body in the sledding position has a circular shape;
   wherein the foldable rod is twisted such that the foldable rod crosses itself at one location to form a lemniscate which becomes a fold whereat a first lob of the intermediate figure eight position is folded onto a second lob of the intermediate figure eight position to place the foldable rod in the storage position; and
   wherein the flexible body includes a multi-layer construction that includes a first layer of nylon and a second layer of vinyl to contact snow in the sledding position and in contact with the first layer; and
   a hem adjacent the perimeter of the flexible body to enclose the foldable rod adjacent the perimeter.

17. The sled of claim 16, wherein the flexible body in the storage position has a diameter of about 12 inches.

18. The sled of claim 17, wherein the flexible body in the storage position has a thickness of about 1 inch.

19. The sled of claim 16, wherein the foldable rod includes a metal rod.

20. The sled of claim 16, wherein the foldable rod includes a plastic rod.

21. The sled of claim 8, wherein the first side includes the nylon and the second side includes the vinyl.

22. The sled of claim 13, wherein the second layer includes vinyl to contact snow in the sledding position.

23. The sled of claim 13, wherein the flexible body in the storage position has a circular shape.

24. The sled of claim 16, wherein the flexible body in both the storage position and the sledding position has a circular shape.

* * * * *